(12) United States Patent
Reuter

(10) Patent No.: US 7,564,154 B2
(45) Date of Patent: Jul. 21, 2009

(54) DISK STORAGE DEVICE WITH BRUSHLESS DC DRIVE MOTOR AND SLIDE BEARING ASSEMBLY

(75) Inventor: Manfred Reuter, St. Georgen (DE)

(73) Assignee: Papst Licensing GmbH & Co. KG, St. Georgen (DE)

( * ) Notice: Subject to any disclaimer, the term of this patent is extended or adjusted under 35 U.S.C. 154(b) by 185 days.

(21) Appl. No.: 11/458,472

(22) Filed: Jul. 19, 2006

(65) Prior Publication Data

US 2008/0018188 A1    Jan. 24, 2008

(51) Int. Cl.
*H02K 5/16* (2006.01)
(52) U.S. Cl. ....................................... 310/90
(58) Field of Classification Search ................... 310/90, 310/90.5, 89
See application file for complete search history.

(56) References Cited

U.S. PATENT DOCUMENTS

| | | | |
|---|---|---|---|
| 5,246,294 A * | 9/1993 | Pan .............................. 384/119 |
| 5,661,351 A | 8/1997 | von der Heide et al. |
| 5,777,822 A | 7/1998 | Schuh |
| 5,796,548 A | 8/1998 | Hans et al. |
| RE36,016 E | 12/1998 | Cap et al. |
| 5,864,443 A | 1/1999 | Elaesser et al. |
| 5,945,751 A | 8/1999 | Hans et al. |
| 5,949,164 A | 9/1999 | Cap et al. |
| 5,949,165 A * | 9/1999 | Sakuragi .................... 310/67 R |
| RE36,931 E * | 10/2000 | Grantz et al. ............. 360/99.08 |
| 6,154,339 A * | 11/2000 | Grantz et al. ............. 360/99.08 |
| RE37,058 E | 2/2001 | Elsasser et al. |
| 6,195,226 B1 | 2/2001 | Papst |
| RE37,455 E | 11/2001 | Muller et al. |
| 6,344,946 B1 | 2/2002 | Papst |
| RE37,638 E | 4/2002 | Cap et al. |
| RE37,825 E | 9/2002 | Hans |
| RE38,264 E | 10/2003 | Hans |
| 2005/0057107 A1* | 3/2005 | Xu et al. .................... 310/67 R |

* cited by examiner

*Primary Examiner*—Hanh N Nguyen
(74) *Attorney, Agent, or Firm*—Marshall, Gerstein & Borun LLP

(57) ABSTRACT

A compact disk storage device having an outer-rotor dc-brushless electric motor for directly driving a disk for recording and reproducing information, having an axially deep, tank-form flange and a stationary shaft, upon which the mounting annulus of the flange and a bearing assembly of the hub are axially displaced. The bearing assembly has the stationary shaft fixedly mounted centrally in the deepened flange via a support bush. The hub includes a cap for sealing an extremity of the bearing assembly and an inverted cup shape rotor providing magnetic shielding.

13 Claims, 2 Drawing Sheets

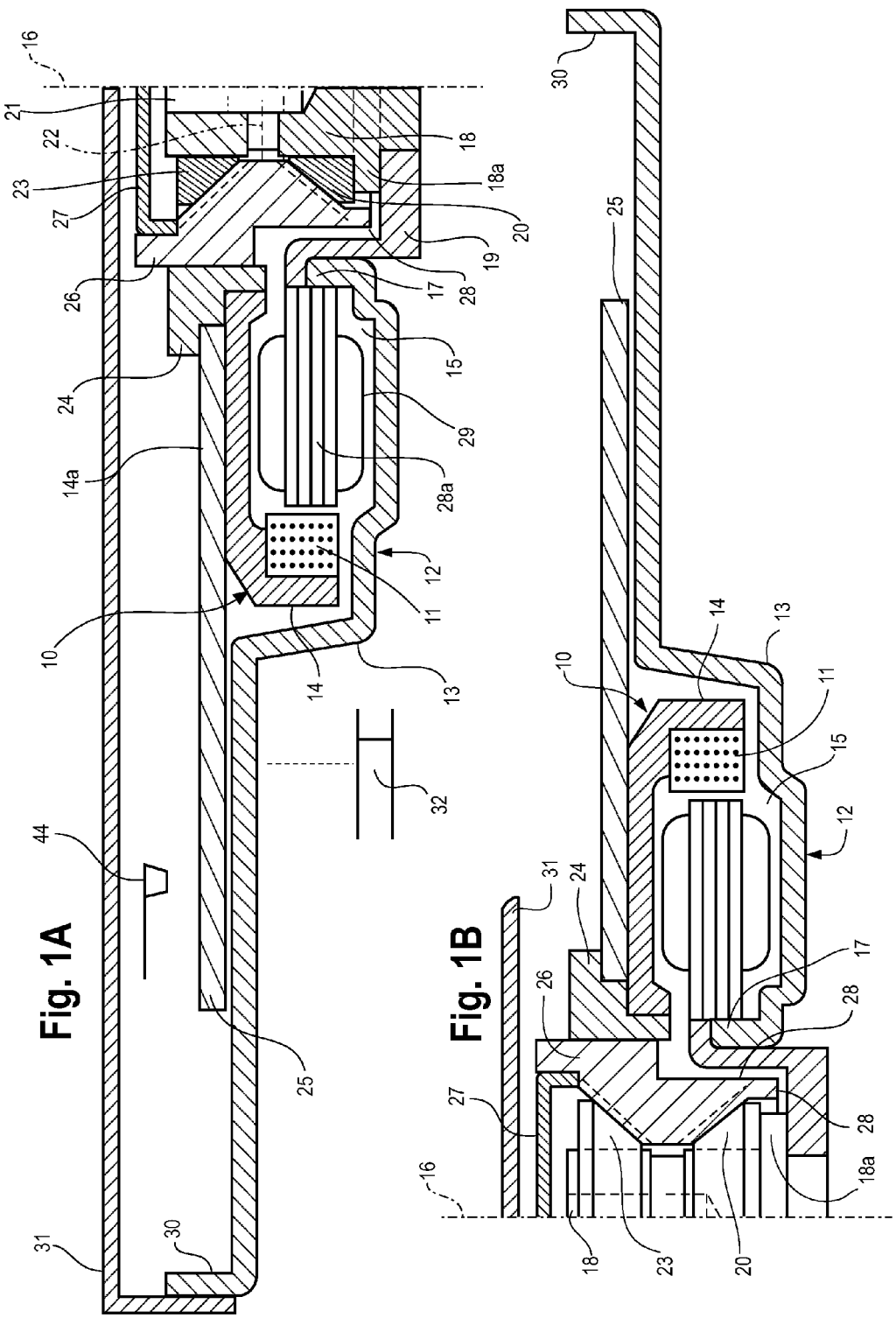

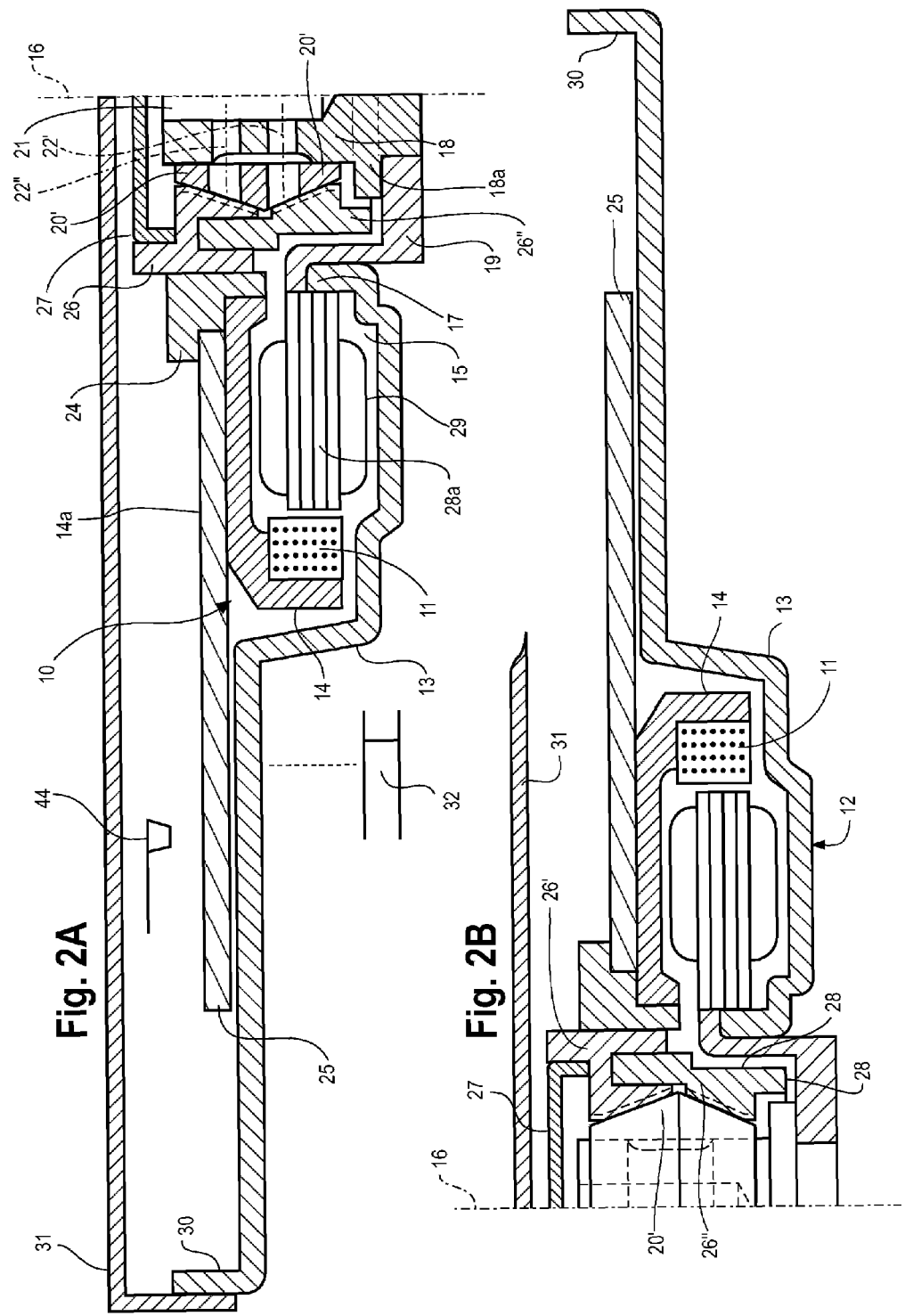

DISK STORAGE DEVICE WITH BRUSHLESS DC DRIVE MOTOR AND SLIDE BEARING ASSEMBLY

FIELD OF THE INVENTION

The present invention relates to rigid disk storage devices using brushless electric motors, especially those for directly driving rotary data carriers requiring "clean room" conditions, such as do many information storage disks.

BACKGROUND OF THE INVENTION

A continuing demand for compactness exists in the information storage disk market. Earlier, this demand was satisfied by external rotor motors, which could be relatively short in an axial direction. Now that demand is also directed toward an ever-diminishing diameter of information storage disks and of the components whereupon the disks are positioned. At the same time, the motor must still supply adequate torque, have a certain minimum angular momentum and smooth-running operation, and inhibit the passage of dirt particles from its bearing assembly and/or torque-generating regions toward a "clean room" region, all without increasing its overall axial dimension. Additionally, always under focus is a need for cost reduction resulting in cheaper components such as the bearing assembly maintaining mechanical precision. In disk storage devices having a form factor of one inch and below for the storage medium diameter ball bearings especially cannot compete in regard to low noise generation and/or low manufacturing costs.

BRIEF DESCRIPTION OF THE DRAWINGS

Various example objects, features and attendant advantages of the present invention will become fully appreciated as the same becomes better understood when considered in conjunction with the accompanying drawings, in which like reference characters designate the same or similar parts throughout the several views, and wherein:

FIG. 1A is a cross-sectional view of a one-half portion of a first exemplary embodiment of the present invention;

FIG. 1B is a cross-sectional view of a one-half portion of the first embodiment of the present invention that is different from that shown in FIG. 1A, in which a motor shaft and two conical members are shown in elevation;

FIG. 2A is a cross-sectional view of a one-half portion of a second exemplary embodiment of the present invention; and FIG. 2B is a cross-sectional view of a one-half portion of the second embodiment of the present invention that is different from that shown FIG. 2A, in which a motor shaft and two conical members are shown in elevation.

DETAILED DESCRIPTION OF A PREFERRED EMBODIMENT

While the present invention is susceptible of embodiment in various forms, there is shown in the drawings, and will hereinafter be described, a presently preferred embodiment with the understanding that the present disclosure is to be considered an exemplification of the invention and is not intended to limit the invention to the specific embodiment illustrated. It should be further understood that the title of this section of this specification, namely, "Detailed Description Of A Preferred Embodiment", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

In accordance with an exemplary embodiment of the present invention, a disk storage device having a drive motor for directly driving a disk for recording and reproducing data, the motor including a hub and a rotor on which the disk can be driven, comprises an axially-deepened, tank-form flange, a stationary shaft fixedly mounted centrally in the deepened flange via a support bush and having an end beyond the flange, a slide bearing assembly; and a hub mounted on said bearing assembly for relative motion with respect to said shaft and including a rotor cup shape of a low-remanence magnetic material, especially a ferromagnetic material, facing into the axially-deepened tank form of the flange, the motor further including and the rotor cup shape further supporting an outer rotor, the motor further including an axially-deepened flange further supporting a stator inserted within the limits of the outer rotor.

It is a feature of the invention that the axially-deepened tank form of the flange facilitates an offset mounting rim thereon that is aligned essentially with the back plane of the rotor cup shape, thereby avoiding axial lengthening of the motor; while the offset mounting rim and rotor cup shape together can provide superior magnetic shielding and can provide an approximation of an outer labyrinth seal for dust particles from the motor.

A further feature of the invention is a stationary shaft held by a support bush in the tank-formed flange. This shaft may be used, for example, to encase a bearing assembly, especially a Fluid Dynamic Bearing (FDB), with a two piece outer sliding bush with slide faces tapered towards the axial end portions of the stationary shaft.

A further feature of the invention is the provision to the shaft of a chamber or blind hole for lubricant. This hole may, for example, be connected to tapered slide faces via radial bores in an inner one-piece slide bush fixed to the stationary shaft.

It is a further feature of the invention that the bearing assembly comprises two tapered inner slide bushes aligned to a one-piece outer slide bush provided with slide faces tapered towards a central portion of said shaft, the outer slide bush being rigidly inserted in said hub.

It is a further feature of the invention that an inner labyrinth seal is provided by narrow gaps between portions of said support bush and an outer slide bush. Further features and advantages of the invention may be acquired from the following detailed description, taken together with the drawings, in which FIG. 1 and FIG. 2 illustrate preferred embodiments of the present invention.

As regards FIG. 1, an outer-rotor cup-like form 10, preferably deep-drawn out of soft iron sheet, surrounds a ring-type permanent magnet 11, preferably a rare earth magnet. The outer-rotor cup-like form 10 serves as the magnetic return path in a simultaneously-provided outer rotor housing, which has its cup-like opening facing toward a flange 12 shown below it, into which it axially projects. The flange 12 is axially offset and has a high-raised rim 13, which lies axially essentially aligned to the extreme outside surface 14 respectively backplane of the rotor cup 10. The flange 12, preferably deep-drawn out of a sheet metal, is provided with recesses 15 radially distributed equidistantly around a central axis 16. The recesses 15 can be either formed as shown or formed as apertures in the flange 12 covered with a foil (not shown). Radially inward of the recesses 15 the flange 12 forms a wall 17 extending essentially rectangular to the rim 13. A central stationary shaft 18 is rigidly attached to a support bush 19 firmly inserted in the center of the flange 12, adjacent the flange wall 17.

The shaft 18 preferably provides a shoulder 18A having a larger diameter than the shaft 18 axially abutting a mounting portion in which the shaft 18 is rigidly inserted into the support bush 19. The support bush 19 is cup shaped and fitted into the flange 12 having a shoulder abutting an axial end face of the flange wall 17. Axially abutting the shoulder 18A of shaft 18 a first slide ring 20 having a cone-shaped form is mounted on the shaft 18. The first slide ring preferably consists of tempered steel and/or has at least one polished annular surface. The shaft 18 comprises a chamber 21 for a lubricant axially aligned with the central axis 16, preferably a blind hole in the shaft from the end face opposite the shaft mounting portion. The lubricant chamber 21 in the radial center of the shaft 18 is furthermore provided with radial bores 22, preferably at least two, supplying lubricant to the outer circumference of the shaft 18 and the rigidly attached first slide ring 20 as well as to a second slide ring 23 rigidly attached to the shaft 18. The second slide ring 23 is also cone-shaped but mounted in opposite direction as the first slide ring 20 so that their slide faces are tilted towards an axially central portion of the shaft 18 provided with the bores 22.

The outer-rotor cup-like form 10 is inserted in a hub 24, which rotates around the stationary shaft 18 via the bearing assembly. This hub 24 is a one-piece part, preferably made of aluminum, having three different outer diameters. At the axial portion closest to the flange 12 the outer diameter is smallest at which radially the outer-rotor cup-like form 10 is attached as well as at a first shoulder formed by a portion of the hub 24 having a larger diameter than the first portion. Preferably the hub 24 is machined as a one piece part with two shoulders to house both the rotor cup shape 10 and at least one disk 25 through their center holes. The hub 24 is fitted to an outer sliding bush 26, for example, by a precise center hole in said hub 24. The outer-rotor cup-like form 10 and the hub 24 are bonded together on its axial underside to the surface 14 of the iron rotor cup 10, preferably by riveting or gluing.

The upper side surface 14a of that rotor cup 10 is strongly drawn radially inward so that said upper side surface yields at the same time a good magnetic shield for the disk chamber, the clean room referred to above; where at least time magnetic storage disk 25 and the reading and recording heads (not shown) are provided. The disk 25 is supported on the surface 14 of the rotor cup 10 and held down by a portion of the hub 24 having a third diameter even larger than the diameter of the second portion.

In this manner, one obtains a very compact arrangement with a stationary shaft 18. Inserted in the hub 24 having a constant inner diameter is a one-piece outer slide bush 26 extending axially beyond the hub 24 towards the flange 12. This outer slide bush 26 has tilted slide faces, preferably grooved, for instance laser patterned, adapted to the slide faces of the first and second inner slide rings 20, 23. A cover disk 27 inserted in the hub 24 rotates with the hub 24, in that it is itself the upper axial termination. Thus over the upper axial portion of the bearing assembly, it is bonded to hub 24. Thereby, a flawless seal of the bearing assembly away from the clean room of the disk chamber is provided.

Between the bearing assembly, especially the lower slide face of the outer slide bush 26, and the space inside of the rotor cup-shape 10 a labyrinth seal 28 showing narrow gaps is provided. Labyrinth elements are provided at the support bush 19 side, which with the rotor-side ridge-like axial projection of the outer slide bush 26 grasp or reach into one another, and are supported on the hub-like extension 39 of the flange 12 or on the flange base. The one-piece hub 24 or the one-piece slide bush 26 optionally extends via at least a ridge-like projection (not shown) downward into an annular groove (not shown) formed in the walls of the support bush 19 or the wall 17 of the flange 12. The hub 24 serves thus simultaneously to bear at least one disk 25 on one of its outer cylindrical surfaces and upon a flat added shoulder, just as for holding the rotor cup 10 on a shoulder from below. In addition, the hub 24 is supported by the outer slide bush 26 carrying the cover disk 27 that rotates with it via the bearing assembly.

On the flange wall 17, which holds the support bush 19, for instance press-fit or glued in, supporting the stationary shaft 18, an inner stator 28a is set over the annular flange wall 17 to which it is fastened, preferably press fit or by means of glue. The stator 28a, for exemple, can also be mounted in the flange 12 by additionally axially abutting a support shoulder (not shown) of the flange 12. The mounting can also be accomplished through the insertion of the entire stator block of the stator 28a in the flange 12, the stator block preferably having a grooved and laminated core building separate poles or pole shoes, each provided with a non-overlapping coil winding 29. Thereby the outer winding extremities can be placed within the recesses 15. Preferably, the stator 28a has 9 stator poles combined with 6 or 12 rotor magnet poles or 12 stator poles combined with 8 rotor magnet poles preferably in each case radially equidistantly distributed.

The flange 12 has at its extreme outer edge a radial projection or rim 30 generally this projection 30 will be screwed together with a further wall 31 sealing in the clean room in which the disk 25 rotates. Outside the clean room opposite the rim surface 13 of flange 12 an electronic circuitry 32 is provided for energizing the windings 29 of the stator 28a. This can create, for example, a magnetic field pattern in a manner to cause the rotor-magnet 11 to rotate in a predetermined direction and speed. The stator winding 29 is preferably a three phase configuration meaning that the number of stator poles is a multiple of three, especially nine or twelve.

The diameter of the cylindrical air gap is not dependent upon the diameter of the center hole of the disk 25. Thereby, the stator 28 having at least nine separate poles each provided with a non overlapping winding 29 and being radially equidistantly distributed also becomes more annular, because the inner stator is, so-to-speak, shifted radially away from the central axis 16. There can also be a labyrinth seal separating the inner motor space from the clean room (outer labyrinth) between the rotor cup shape 10 and a radial and/or axial flange wall.

The preferred embodiment as shown in FIG. 2 differs from FIG. 1 with respect to the bearing assembly. According to the embodiment of FIG. 2, axially abutting the shoulder 18A of shaft 18 a one-piece slide ring 20' having an urn shaped form is mounted on the shaft 18. The one-piece inner slide ring 20' preferably consists of tempered steel and/or has at least one polished surface. The shaft 18 comprises a chamber 21 for a lubricant axially aligned with the central axis 16, preferably a blind hole in the shaft 18 from the end face opposite the shaft mounting portion. The lubricant chamber 21 in the radial center of the shaft 18 is furthermore provided with radial bores 22', 22" supplying lubricant to the outer circumference of a one-piece inner slide ring 20' also having radial bores, preferably in two axial planes respectively, as shown. Its slide faces are tilted towards an axial end portion of the shaft 18.

Inserted in the hub 24 having a constant, cylindrical inner diameter is a first outer slide bush portion 26'. This first outer slide bush 26' has a tilted slide face, preferably grooved, for instance laser patterned, adapted to the upper slide face of the one-piece inner slide ring 20'. A second outer slide bush 26" is attached to the first outer slide bush 26', for example, by means of a u-shaped annular groove in which the second outer slide 26" bush is inserted. It has a slide face similar to the one of the first outer slide bush 26' except tilted towards the other axial end portion of the shaft 18. The second outer slide bush 26" extends axially beyond the hub 24 towards the flange 12. Both outer slide bushes 26', 26" provide slide faces forming a widely opened v adapted to the urn-shaped inner one-piece slide ring 20'.

One advantage of the present invention lies in the bearing assembly providing a mechanically precise support of the disk, avoiding or at least minimizing radial and/or axial play, with a run-out being superior to other bearing systems while reducing manufacturing costs.

The present concept has a further advantage that an increased momentum requirement is achievable because a larger air gap diameter can be maintained independent of disk or hub diameter, which are ruled by standardization requirements for information storage disks.

Through the above-described concept, the radial lever of the air gap of an outer rotor motor may be increased as desired, practically at will, through radial enlargement of the axially deepened flange configuration. The deepening of the flange configuration permits an axial compactness because the bearing assembly and axial extension are axially, rather than radially, aligned.

The cup shape 10 is preferably made of a low-remanence magnetic and/or ferromagnetic material. This offers, for example, a relatively good magnetic shielding, since it simultaneously serves as the magnetic return path, making it thicker than needed for magnetic shielding alone.

The present invention is not limited to the preferred embodiments described in detail above but comprises various modifications and adaptations especially falling within the scope of the subsequent claims. Even though primarily considering small form factors of one inch and below, for instance 0.8 inches, the present invention is also applicable to larger sizes. Despite the fact that two integrated baseplate assemblies, especially meaning a large flange, have been described, the present invention is also applicable to drop-in motor configurations, especially meaning a smaller flange e.g. about the diameter of the rotor cup shape. The drawings are to be considered exemplary and not necessarily to scale.

The brushless DC motor illustrated in FIGS. 1 and 2 can be constructed and commutated in a number of different ways as readily apparent to one of ordinary skill in the relevant art. For example, the motor can be a three-phase motor, and three different control signals can be generated that are representative of the position of the rotor with respect to the stator. Such control signals can be generated, for example, by sensing the back-EMF that is generated when the motor is running. Alternatively, rotor position sensors such as Hall generators that operate in bi-stable fashion can be utilized as, for example, disclosed in U.S. Pat. Nos. 5,661,351 and 5,801,900, which are incorporated by reference into this application as if fully set forth herein.

A circuit (not shown) receives the rotor position signals, and then energizes the phase windings of the motor to selectively generate magnet poles that operatively interact with the magnetic poles defined in the permanent magnetic ring 11 to spin the storage disk 25 about its central axis. In one embodiment of the present invention, a separate motor IC is utilized to receive the control signals and commutate the motor. Alternatively, appropriate motor commutation software routines can be stored in the processing unit of a host device (e.g., an MP3 player or a cell phone) which has a hard disk drive as a component thereof. This is advantageous because, for example, the material and labor costs associated with engineering a separate motor control IC into a complete product are eliminated. This allows, for example, the retail price of the host device to be lowered.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A disk storage device comprising:
   a housing that encloses a clean chamber;
   at least one hard magnetic storage disk provided in the clean chamber for rotation about an axis, the at least one disk having a central opening;
   at least one data head mounted in the clean chamber for movement in operative relation to the at least one hard magnetic storage disk; and
   a brushless DC motor which is adapted to rotate the at least one disk about the axis, the brushless DC motor including
      a shaft and a bearing assembly aligned on the axis,
      a stator carrying coil windings both of which are arranged substantially coaxially relative to the axis, the coil windings being adapted to be energized in accordance with commutation signals that are generated by one or more software routines that are stored in a processing unit of a host device of which the disk storage device is a component part,
      a magnet having a generally cylindrical surface that is radially spaced apart from a generally cylindrical surface of the stator to form a generally cylindrical air gap, the magnet and the coil winding being displaced away from a plane of the at least one disk in a direction along the axis such that a diameter of the central opening of the at least one disk is smaller than at least one of an inner diameter of the magnet and the outer diameter of the magnet,
      an axially deepened, tank-form flange that forms a part of the housing, the entirety of an axial length of the magnet being received within a recess defined within the axially deepened, tank form flange,
      wherein the bearing assembly comprises a first race that comprises first and second conical members that are concentrically disposed about the axis of the shaft, the bearing assembly further comprising a second race that is concentric with the shaft and the first and second conical members of the first race, and
      wherein first and second lubricant passageways are defined between adjacent surfaces of the first race and the first and second conical members of the second race, the first and second lubricant passageways extending from a location adjacent a radial end of the bearing assembly towards an central portion of the bearing assembly, the first and second lubricant passageways not being parallel or perpendicular to the axis of the shaft, but rather being disposed at first and second angles thereto, respectively, to generally enlarge the surface area of the first and second lubricant passageways between the first and second races.

2. The disk storage device of claim 1, wherein the brushless DC motor further includes a cap having an outer cylindrical surface engaged to an inner cylindrical surface of a first one of the first and second races, the cap sealing an end of the shaft within a volume defined at least in part by the cap, and an inner surface of one of the first and second races such that an axial end surface of the other of a second one of the first and second races being exposed within the sealed volume.

3. The disk storage device of claim 2, wherein the brushless DC motor further comprises an aluminum ring member that is mounted on an outer cylindrical surface of one of the first and second races.

4. The disk storage device of claim 1, wherein the bearing assembly comprises a two piece outer sliding bush with slide faces tapered towards the axial end portions of the shaft.

5. The disk storage device of claim 4, wherein the shaft is provided with a chamber for lubricant connected to the tapered sliding faces via radial bores in an inner one-piece slide bush fixed to the shaft.

6. The disk storage device of claim 1, wherein the bearing assembly comprises two tapered inner slide bushes adapted to a one-piece outer slide bush provided with slide faces tapered towards a central portion of the shaft the outer slide bush being rigidly inserted in the hub.

7. The disk storage device of claim 1, wherein an axially-extending portion of the support bush adjacent the shaft and bearing assembly and a portion of an outer slide bush of the bearing assembly together provide an inner labyrinth seal.

8. The disk storage device of claim 1, wherein the tank-form flange is provided with recessed sections for housing at least a portion of the coil windings of the stator.

9. The disk storage device of claim 1, wherein the shaft is stationary.

10. The disk storage device of claim 1, wherein the magnet coaxially surrounds the stator.

11. The disk storage device of claim 1, wherein the diameter of the air gap is different from the diameter of a hole in the at least one hard magnetic storage disk.

12. The disk storage device of claim 1, wherein the second race coaxially surrounds the first race.

13. The disk storage device of claim 1, wherein the first and second conical members of the first race of the bearing assembly are not integrally formed as a portion of each other.

* * * * *